(12) United States Patent
Vereecke et al.

(10) Patent No.: US 7,502,376 B2
(45) Date of Patent: Mar. 10, 2009

(54) LAYER-2 NETWORK WITH VIRTUAL PRIVATE LAN SERVICE

(75) Inventors: Karel Magdaleen Omer Vereecke, Ghent (BE); Ronny Maria Theodoor Vereecke, legal representative, Evergem (BE); Marijke Anna Godelieve Van Den Abeele, legal representative, Evergem (BE); Eveline Renata Irena Vereecke, legal representative, Ghent (BE); Willem Mark Rita Vereecke, legal representative, Evergem (BE); Pierre Alfons Leonard Verhelst, Wilrijk (BE)

(73) Assignee: Alcatel, Paris (FR)

( * ) Notice: Subject to any disclaimer, the term of this patent is extended or adjusted under 35 U.S.C. 154(b) by 586 days.

(21) Appl. No.: 11/098,689

(22) Filed: Apr. 5, 2005

(65) Prior Publication Data

US 2005/0220077 A1 Oct. 6, 2005

(30) Foreign Application Priority Data

Apr. 6, 2004 (EP) .................................. 04290909

(51) Int. Cl.
*H04L 12/28* (2006.01)
(52) U.S. Cl. ..................... 370/408; 370/238; 370/256
(58) Field of Classification Search ............... 370/238, 370/256, 408
See application file for complete search history.

(56) References Cited

U.S. PATENT DOCUMENTS 6,697,339 B1 * 2/2004 Jain ........................... 370/256
6,937,576 B1 * 8/2005 Di Benedetto et al. ...... 370/256
7,145,878 B2 * 12/2006 Katz .......................... 370/238
2006/0233186 A1 * 10/2006 Portolani et al. ............ 370/408

OTHER PUBLICATIONS

F. Brockners et al, "Metro Ethernet—deploying the extended campus using Ethernet technology", IEEE, Oct. 20, 2003.
IEEEEE P802.1D/DR Oct. 31, 2003—Draft Standard for Local and Metropolitan Area Networks; Media Access Control (MAC) Bridges.

* cited by examiner

*Primary Examiner*—Chi H Pham
*Assistant Examiner*—Albert T Chou
(74) *Attorney, Agent, or Firm*—Sughrue Mion, PLLC

(57) ABSTRACT

A method to provide a loop-free telecommunication network comprising end-users interconnected through one or more Metropolitan Area Network and/or Wide Area Network providing Virtual Private Local Area Network Service (VPLS) and possible geographically dispersed Layer-2 networks (K, L) is provided. To prevent the VPLS-networks from creating loops, a predetermined protocol, e.g. the Rapid Spanning Tree Protocol is used. Internal node ports of each node of a VPLS-network are grouped into a port arrangement in order to model a virtual LAN inside the VPLS-network. For each port arrangement, the sum of weight factors or port Path Cost towards a root bridge is calculated, the node having an external node port with the lowest port path cost is selected as the primary node, and the paths of the other external node ports towards the root bridge are disabled. In case two or more nodes of a VPLS-network have an identical port path cost, the node number or node ID for selecting the primary node is taken into account.

9 Claims, 1 Drawing Sheet

LAYER-2 NETWORK WITH VIRTUAL PRIVATE LAN SERVICE

FIELD OF THE INVENTION

The present invention relates to a method to provide a loop-free telecommunication network wherein end-user stations are interconnected through at least one Virtual Private LAN Service VPLS-network and Layer-2 networks, some Layer-2 networks possibly including bridges, said VPLS-network comprising nodes with external node ports coupled to said Layer-2 networks, each node further having internal node ports interconnecting the nodes inside a same VPLS-network, said bridges comprising external bridge ports coupled to external ports of nodes or of other bridges, each port being associated to a predetermined weight factor, the method comprising the step of using a predetermined protocol to prevent loops through the interconnected nodes and bridges.

BACKGROUND OF THE INVENTION

Such a method for providing a loop-free telecommunication network is generally known in the art. Therein, the telecommunication network comprises at least one Metropolitan Area Network (MAN) and/or Wide Area Network (WAN) providing Virtual Private Local Area Network (LAN) Service (VPLS), i.e. connectivity between possible Layer-2 networks as if they were connected using a LAN. Each Layer-2 network may comprise bridges and LAN segments.

In a telecommunication network of the Layer-2 type, no connectivity loops should exists. To this end, bridges run a known protocol in the Layer-2 network to keep it loop-free and disable or cut the links that cause loops.

The protocol to prevent loops is preferably the Spanning Tree Protocol (STP) or the Rapid Spanning Tree Protocol (RSTP) as defined in the standard IEEE 802.1D-2003. This protocol is running on each bridge in the network and the bridges are exchanging "bridge Protocol Data Units" (BP-DUs; PDU being a general name for a data packet) to spread topology information throughout the network.

Although internal in the VPLS-network there are no effective loops, by design of the VPLS, loops in the network can be constructed by connections outside of the VPLS-network.

A problem is how to resolve possible loops that are caused by interconnecting Layer-2 networks and a VPLS-network, hereafter also merely called VPLS. The straightforward idea is to let the nodes in the VPLS run "regular STP" or "regular RSTP" on the ports of all its nodes. However, this would create possible disabling of links internal to the VPLS and in turn would render the VPLS unusable.

A first solution is proposed in a VPLS IETF-draft. It consists in making the VPLS transparent for the (R)STP protocol. This is achieved by tunneling all BPDUs through the VPLS as if they were normal data packets. However, a disadvantage of this known solution is that the operation of the (R)STP is not efficient on the links to the VPLS. As seen from the bridge connecting to the VPLS, the link is a link to a shared medium: all other bridges attached to the VPLS appear to be on the same medium. This causes (R)STP to operate significantly slower.

Another possible solution is proposed by the "Timetra Spanning Tree Protocol" (TSTP) developed by Alcatel™. In this other known solution, the nodes in the VPLS are participating in the STP protocol on its external interfaces only. This works when a dedicated, unique role is assigned to the VPLS-network: the role of "root bridge". The TSTP solves the above-mentioned disadvantage of inefficiency. However, a new disadvantage is introduced. The VPLS claims on its external interfaces to have the root bridge, thus making it impossible to have any other bridge of a Layer-2 network connected to the VPLS to be the root bridge from which the STP protocol starts operating, as it is generally the case.

SUMMARY OF THE INVENTION

An object of the present invention is to provide a method to provide a loop-free telecommunication network of the above known type but which is efficient and allows having a root bridge in any of the Layer-2 networks connected to the VPLS.

According to the invention, this object is achieved due to the fact that said method further comprises the steps of:
grouping the internal node ports of each node of the VPLS-network into a distinct port arrangement,
setting the weight factors associated to the port arrangements to the value zero,
defining one of the nodes or bridges as a root bridge,
calculating, for each of said external node ports of the nodes of said VPLS-network, the sum of the weight factors from this external node port towards the root bridge,
selecting the node of which an external node port has the lowest sum of weight factors as primary node for the VPLS-network, and
cutting, towards external ports of said root bridge, the coupling of external node ports that have a sum of weight factors that is higher than the sum of weight factors of the external ports of said primary node towards said root bridge.

By grouping the internal node ports of each node of the VPLS-network in a distinct port arrangement, the interconnection of the nodes of the VPLS-network is modeled as an internal Local Array Network (LAN). In this way, it is possible to obtain a relatively efficient loop-free telecommunication network that allows having a root bridge in any of the Layer-2 networks connected to the VPLS.

In a (R)STP operation, one bridge of the Layer-2 network is selected as the root bridge, and each bridge participating in RSTP calculates a shortest path to this root bridge. The ports of the bridge that provide alternate paths to the root bridge are put in blocking state. In this way, a (Spanning) Tree of bridges is created starting from the root bridge and all loops have been disabled.

According to the present invention, the VPLS nodes fit in the Spanning Tree. The internal connections of the VPLS are modeled as connections to a shared LAN segment. As each of the Nodes in the VPLS network is taking the role of an RSTP bridge, the transition timings over the internal LAN are influenced strongly by the operation of RSTP. As generally known, the convergence of RSTP is significantly slower over a shared medium compared to a point-to-point connection. When a point-to-point link should be enabled according to one of the attached bridges, the bridge will send out a Proposal to the bridge on the other side of the link. As soon as an Agreement is received from this second bridge, the link is enabled. In regular RSTP, this mechanism is not possible over a shared medium, because a bridge does not know how many other bridges are attached to the shared medium. However, a node in a VPLS knows about each of the other nodes in the same VPLS. It is thus easy to extend the mechanism of the transition on a point-to-point link to the shared LAN in the VPLS. This can be done as follows:
when a first node wants to enable its port arrangement to the shared medium, it sends out a Proposal message; and as soon as this first node has received an Agreement in return from each of the other nodes in the VPLS, the first node can enable its port arrangement.

This mechanism provides a substantial improvement of the transition from a disabled link to an enabled link status in the VPLS.

As already mentioned, the coupling of all the port arrangements of a VPLS is thereby modeled as an internal LAN to which each node of the VPLS has only one connection: the port arrangement. Each VPLS node then takes the role of a bridge running (R)STP.

A "weight factor" of zero is associated to each (internal) port arrangement.

This construction leads to the following situation. The VPLS node that has the shortest path (i.e. the sum of the weight factors through this path) to the root bridge becomes the primary node for the VPLS; all other nodes in the VPLS will see the path through the primary node as the best path to the root bridge. As a result, none of the internal links (port arrangements) will be disabled by (R)STP because they are part of the shortest path to the root bridge.

In case there are multiple VPLS nodes that have a same shortest path to the root bridge, the (R)STP protocol should be adapted to select one of these nodes with the shortest path to the root bridge as primary node.

Another characterizing embodiment of the present invention is that, in case a plurality of external node ports of different nodes of the VPLS-network have an identical lowest sum of weight factors towards said root bridge, said method further comprises the step of:
 attributing a distinct node identity to each node of the telecommunication network,
 taking into account the node identity of the nodes while selecting a primary node amongst said plurality of port arrangements within said VPLS-network.

In this way, only one single node of the VPLS-network can be selected as primary node. As a result, all other nodes take the path through the primary node as the shortest path to the root bridge.

Referring to the above-mentioned first solution proposed in the VPLS IETF-draft, a second disadvantage of this known solution is that loops are not detected when they consist of links that couple several VPLSs without passing through external bridges. This means that it is not possible to couple several VPLSs with multiple links when using this first known solution.

On the other hand, although the TSTP of Alcatel™ solves the first mentioned disadvantage of inefficiency, it requires emulating a well-chosen topology inside the VPLS, i.e. emulating a "Virtual Root Bridge" in the center of the VPLS. This requires that no two VPLSs running TSTP can be present in the network. Consequently, the above-mentioned second disadvantage is still holding.

This problem is solved as follows.

In a preferred embodiment, the present invention is further characterized in that said telecommunication network comprises at least two VPLS-networks, in that at least two external node ports of a first VPLS-network are coupled to external node ports of a second VPLS-network, in that each port of the second VPLS-network is associated to a predetermined weight factor, and in that said method further comprises the steps of:
 grouping the internal node ports of each node of said second VPLS-network into a distinct port arrangement,
 setting the weight factors associated to the port arrangements to the value zero,
 calculating, for each of said external node ports of the nodes of said second VPLS-network, the sum of the weight factors from this external node port towards the root bridge,
 selecting the node of which an external node port has the lowest sum of weight factors as primary node for the second VPLS-network, and
 cutting, towards external ports of said root bridge, the coupling of external node ports that have a sum of weight factors that is higher than the sum of weight factors of the external ports of said primary node for the second VPLS-network towards said root bridge.

In this way, the present method allows providing a loop-free telecommunication network even when several VPLS-networks are interconnected therein. The VPLS can participate efficiently in (R)STP protocol in the Layer-2 network it attaches to without having created any external restriction. On its external interfaces, the VPLS is fully compatible with IEEE 802.1D-2003. Additionally, the choice of the root bridge is not restricted in any way with respect to the standard (R)STP.

Also another characterizing embodiment of the present invention is that at least one external node port of a node of said first VPLS-network is coupled to an external node port of a node of said second VPLS-network via external node ports of nodes of at least one third VPLS-network.

The architecture of the telecommunication network may thus include any number of VPLS-networks while remaining loop-free.

Yet another characterizing embodiment of the present invention is that, in case a plurality of port arrangements of different nodes of a particular VPLS-network have an identical lowest sum of weight factors towards said root bridge, said method further comprises the step of:
 attributing a distinct node identity to each node of said particular VPLS-network,
 taking into account the node identity of the nodes while selecting a primary node amongst said plurality of port arrangements within said particular VPLS-network.

In this way, only one single node in each VPLS-network is selected as primary node. Again, in each VPLS-network, all other nodes take the path through this primary node as the shortest path to the root bridge.

Further characterizing embodiments of the present method are mentioned in the appended claims.

It is to be noticed that the term 'comprising', used in the claims, should not be interpreted as being restricted to the means listed thereafter. Thus, the scope of the expression a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein FIG. 1 represents a telecommunication network according to the invention and with two Virtual Private LAN Service VPLS-network coupled to bridges of Layer-2 networks.

Figure 1:
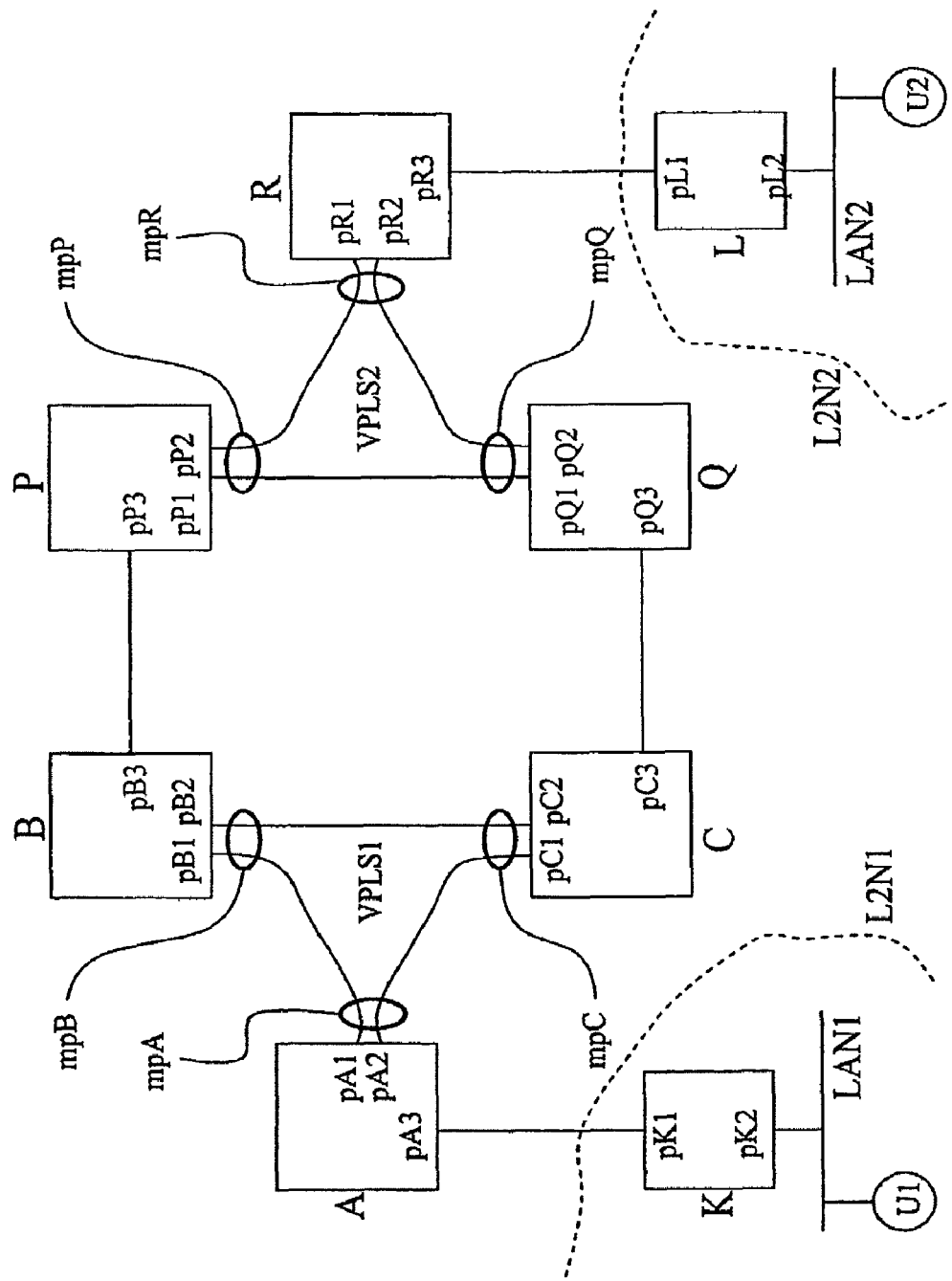
FIG. 1 depicts a telecommunication network according to an exemplary embodiment of the present invention.

DETAILED DESCRIPTION OF THE
EXEMPLARY EMBODIMENTS OF THE
INVENTION

The telecommunication network shown in FIG. 1 is a network comprising two end-user stations U1 and U2 coupled through geographically dispersed Layer-2 networks and Virtual Private Local Area Network (LAN) Service VPLS-networks. In more detail, the end-user station U1 is connected to a first Layer-2 network comprising a first Local Area Network LAN 1 to which a bridge port pK2 of a first bridge K is also connected. Similarly, the end-user station U2 is connected to a second Layer-2 network comprising a second Local Area Network LAN2 to which a bridge port pL2 of a second bridge L is also connected. The bridges K and L have respective external bridge ports pK1 and pL1 connected to external node ports pA3 and pR3 of nodes A and R of two distinct VPLS-networks VPLS1 and VPLS2 . The VPLS-network VPLS1 comprises the nodes A, B and C, whilst the VPLS-network VPLS2 comprises the nodes P, Q and R. These nodes have internal node ports interconnected inside the VPLS-network.

In the VPLS-network VPLS1, node A has an internal node port pA1 connected to an internal node port pB1 of node B, node A has another internal node port pA2 connected to an internal node port pC1 of node C, and node B has another internal node port pB2 connected to another internal node port pC2 of node C. The internal node ports pA1, pA2; pB1, pB2; pC1, pC2 of a same node A; B; C are grouped in a port Arrangement mpA; mpB; mpC respectively.

Similarly, in the VPLS-network VPLS2, node P has an internal node port pP1 connected to an internal node port pQ1 of node Q, node P has another internal node port pP2 connected to an internal node port pR1 of node R, and node Q has another internal node port pQ2 connected to another internal node port pR2 of node R. The internal node ports pP1, pP2; pQ1, pQ2; pR1, pR2 of a same node P; Q; R are grouped in a port Arrangement mpP; mpQ; mpR respectively.

Finally, node B has an external node port pB3 connected to an external node port pP3 of node P, and node C has an external node port pC3 connected to an external node port pQ3 of node Q.

In the telecommunication network, a predetermined protocol is used to prevent loops. This protocol is a "Spanning Tree Protocol" (STP) or, preferably, a "Rapid Spanning Tree Protocol" (STP) as defined in the Standard IEEE 802.1D-2003. Hereafter, we will only refer to the preferred RSTP protocol, also called RSTP algorithm, although a similar description may be provided for the STP protocol.

Each port of a bridge and each port of a node is associated to a predetermined weight factor. This weight factor is generally a port Path Cost as defined in the Standard IEEE 802.1D-2003. Furthermore, one of the nodes or one of the bridges is defined as a "root bridge".

The RSTP algorithm will construct a tree of interconnected bridges. Each of the bridges K, L has a unique identifier, the "bridge ID". The starting point of the tree is the root bridge. The root bridge is always the bridge with the lowest bridge ID in the network. All other bridges in the network have one or more paths towards the root bridge. Amongst these paths, only one single "best path" (port) with the lowest path cost towards the root bridge is selected for each bridge, the other paths of that bridge are "cut". The path cost corresponds to the sum of the weight factors through this path.

Each of the nodes in the VPLS-network plays the role of a "standard" bridge. As mentioned above, each node, say A, has internal node ports pA1, pA2 and at least one external node port pA3. The internal ports of a node are grouped in a port arrangement mpA, hereafter more generally called "mPort". From the point of view of the RSTP protocol, the mPorts of the VPLS-network are all connected to a virtual LAN segment inside the VPLS-network. The mPort of a node thus represents the connection of the node to all other nodes into the VPLS-network.

A mPort has a cost or weight factor of zero, so that an interconnection between two nodes of the VPLS-network cannot be cut, unless there are multiple equal cost shortest paths from different nodes of a same VPLS to the root bridge.

Only one of the nodes in the VPLS-network may have an external path to the root bridge. The node having a node port with this path is called "primary node" for the VPLS-network. All other nodes of the VPLS-network have to take the primary node in their path to the root bridge, these nodes staying thereby connected.

However, two nodes of a same VPLS-network may have an equal shortest path to the root bridge. In this case, one primary node has to be selected amongst these two nodes to prevent cutting the link between them. In such a case, a unique identifier, the node number or "node ID", similar to the above-mentioned bridge ID, is allocated to each node. This node ID is taken into account for the calculation of the path cost to the root bridge. The node ID is for instance "added" to the weight factor of the port. As a result, two nodes of a same VPLS-network and with a same former "best path" to the root bridge will have a different "best path" when the node ID is taken into account. A primary node may then easily be chosen amongst these two nodes.

Summarizing, with this topology, two steps need to be taken to avoid cutting internal node port connections in the VPLS-network:
1. The port Path Cost as defined in the Standard IEEE 802.1D-2003 is set to zero for the mPorts of the VPLS-networks. In this way, there is no extra cost related to take a path through the VPLS-network; and
2. When multiple nodes in the VPLS-network claim to have the shortest path to the root bridge, the node with the lowest node ID is selected to be the primary node for that VPLS-network.

As an example, the bridge L is defined as being the root bridge. Furthermore, in this topology, node B of VPLS1 has a path to the root bridge L via its external node port pB3 with a cost of p, and via its mPort mpB with a cost of q. The node ID of node B is smaller than the node ID of node C. Following cases can be distinguished:

If p<q: node B of VPLS1 has the shortest path to the root bridge L amongst all the nodes of VPLS1. As a result, node B is the primary node of VPLS1, and node C will disable or cut the external node port pC3 towards node Q of VPLS2;

If p>q: node C of VPLS1 has the shortest path to the root bridge L amongst all the nodes of VPLS1. As a result, node C is the primary node of VPLS1, and node B will disable or cut the external node port pB3 towards node P of VPLS2; or If p=q: nodes B and C have the same shortest path to the root bridge L amongst all the nodes of VPLS1. However, since the node ID of node B is the smallest of the node numbers of the nodes B and C, node B will be primary node of VPLS1 and node C will disable the port pC3.

As described, a redundant interconnection between two VPLS-networks VPLS1 and VPLS2 has been created. As a result, there is a stable topology for all node IDs and bridge IDs as well as port path cost parameters allowed by the above-mentioned RSTP standard.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. A method to provide a loop-free telecommunication network wherein end-user stations (U1; U2) are interconnected through at least one Virtual Private LAN Service VPLS-network (VPLS1; VPLS2) and Layer-2 networks (L2N1; L2N2), the Layer-2 networks including bridges (K; L), said VPLS-network comprising nodes (A, B, C; P, Q, R) with external node ports (pA3, pB3, pC3; pP3, pQ3, pR3) coupled to said Layer-2 networks, each node further having internal node ports (pA1, pA2, pB1, pB2, pC1, pC2; pP1, pP2, pQ1, pQ2, pR1, pR2) interconnecting the nodes inside a same VPLS-network, said bridges comprising external bridge ports (pK1, pK2; pL1, pL2) coupled to external ports of nodes or of other bridges, each port being associated to a predetermined weight factor, the method comprising the step of using a predetermined protocol to prevent loops through the interconnected nodes and bridges, said method further comprises the steps of:

grouping the internal node ports (pA1, pA2, pB1, pB2, pC1, pC2; pP1, pP2, pQ1, pQ2, pR1, pR2) of each node (A, B, C; P, Q, R) of the VPLS-network (VPLS 1; VPLS2) into a distinct port arrangement (mpA, mpB, mpC; mpP, mpQ, mpR), setting the weight factors associated to the port arrangements to the value zero, defining one of the nodes or bridges as a root bridge, calculating, for each of said external node ports (pA3, pB3, pC3; pP3, pQ3, pR3) of the nodes of said VPLS-network, the sum of the weight factors from this external node port towards the root bridge, selecting the node of which an external node port has the lowest sum of weight factors as primary node for the VPLS-network, and cutting, towards external ports of said root bridge, the coupling of external node ports that have a sum of weight factors that is higher than the sum of weight factors of the external ports of said primary node towards said root bridge.

2. The method according to claim 1, wherein, in case a plurality of external node ports of different nodes of the VPLS-network have an identical lowest sum of weight factors towards said root bridge, said method further comprises the step of:

attributing a distinct node identity to each node of the telecommunication network, taking into account the node identity of the nodes while selecting a primary node amongst said plurality of port arrangements within said VPL S-network.

3. The method according to claim 1, wherein said telecommunication network comprises at least two VPLS-networks (VPLS1; VPLS2), at least two external node ports (pB3, pC3) of a first VPLS-network (VPLS1) are coupled to external node ports (pP3, pQ3) of a second VPLS-network (VPLS2), each port of the second VPLS-network is associated to a predetermined weight factor, said method further comprises the steps of:

grouping the internal node ports (pP1, pP2, pQ1, pQ2, pR1, pR2) of each node (P, Q, R) of said second VPLS-network (VPLS2) into a distinct port arrangement (mpP, mpQ, mpR), setting the weight factors associated to the port arrangements to the value zero, calculating, for each of said external node ports (pP3, pQ3, pR3) of the nodes of said second VPLS-network, the sum of the weight factors from this external node port towards the root bridge, selecting the node of which an external node port has the lowest sum of weight factors as primary node for the second VPLS-network, and cutting, towards external ports of said root bridge, the coupling of external node ports that have a sum of weight factors that is higher than the sum of weight factors of the external ports of said primary node for the second VPLS-network towards said root bridge.

4. The method according to claim 3, wherein at least one external node port of a node of said first VPLS-network is coupled to an external node port of a node of said second VPLS-network via external node ports of nodes of at least one third VPLS-network.

5. The method according to claim 3, wherein, in case a plurality of port arrangements of different nodes of a particular VPLS-network have an identical lowest sum of weight factors towards said root bridge, said method further comprises the step of:

attributing a distinct node identity to each node of said particular VPLS-network, taking into account the node identity of the nodes while selecting a primary node amongst said plurality of port arrangements within said particular VPLS-network.

6. The method according to any of the claims 1 or 3, wherein said weight factor is a port Path Cost as defined in the Standard IEEE 802.1D-2003.

7. The method according to any of the claims 2 or 5, wherein said node identity is defined in the Standard IEEE 802.1D-2003.

8. The method according to claim 1, wherein said protocol to prevent loops is a Spanning Tree Protocol (STP) as defined in the Standard IEEE 802.1D-2003.

9. The method according to claim 1, wherein said protocol to prevent loops is a Rapid Spanning Tree Protocol (RSTP) as defined in the Standard IEEE 802.1D-2003.

* * * * *